United States Patent
Deica et al.

(10) Patent No.: US 8,771,437 B2
(45) Date of Patent: Jul. 8, 2014

(54) WEAR DETECTION SYSTEM FOR A CUTTING NOZZLE ON A CUTTING TORCH FOR CUTTING STEEL WORKPIECES

(75) Inventors: Alexander Deica, Hünstetten (DE); Wigbert Buhr, Horhausen (DE)

(73) Assignee: GeGa Lotz GmbH, Hofheim-Wallau (DE)

( * ) Notice: Subject to any disclaimer, the term of this patent is extended or adjusted under 35 U.S.C. 154(b) by 165 days.

(21) Appl. No.: 13/514,297

(22) PCT Filed: Apr. 19, 2011

(86) PCT No.: PCT/EP2011/056188
§ 371 (c)(1),
(2), (4) Date: Jun. 7, 2012

(87) PCT Pub. No.: WO2012/143042
PCT Pub. Date: Oct. 26, 2012

(65) Prior Publication Data
US 2013/0062426 A1    Mar. 14, 2013

(51) Int. Cl.
*B23K 37/00* (2006.01)
*B23K 7/00* (2006.01)
*B23K 9/013* (2006.01)
*B23K 7/10* (2006.01)

(52) U.S. Cl.
CPC ............... *B23K 37/006* (2013.01); *B23K 7/008* (2013.01); *B23K 2203/04* (2013.01); *B23K 2201/18* (2013.01); *B23K 9/013* (2013.01); *B23K 7/10* (2013.01)
USPC ................................. 148/195; 266/48; 266/78

(58) Field of Classification Search
CPC ................................. B23K 7/10; B23K 37/006
USPC ............................... 266/48, 78; 148/195, 194
See application file for complete search history.

(56) References Cited

U.S. PATENT DOCUMENTS

| 5,717,187 A | 2/1998 | Rogozinski |
| 2013/0062426 A1* | 3/2013 | Deica et al. ........................ 239/1 |

FOREIGN PATENT DOCUMENTS

| AT | WO2008/031132 A1 | 3/2008 |
| EP | 1211015 A1 | 6/2002 |

* cited by examiner

*Primary Examiner* — Scott Kastler
(74) *Attorney, Agent, or Firm* — Michael Soderman

(57) ABSTRACT

The invention concerns a method for detecting the wear of a cutting nozzle on a cutting torch for cutting steel workpieces, in particular slabs, blooms and slugs. A branch line exits to the cutting torch in the feed line of the heating gas connection, into which branch line a neutral medium with a set pressure is blown through the cutting nozzle after closing the medium valves for heating gas, cutting oxygen and heating oxygen. To do so, said process is carried out once when installing a new cutting nozzle for the calibration thereof. Said process is performed again at set intervals, depending on the usage of the cutting nozzle, in order to determine and to store in memory the wear condition of the cutting nozzle and to generate an optical and/or acoustic signal in case a predetermined maximum admissible deviation amount of the medium blown in has been exceeded.

7 Claims, 1 Drawing Sheet

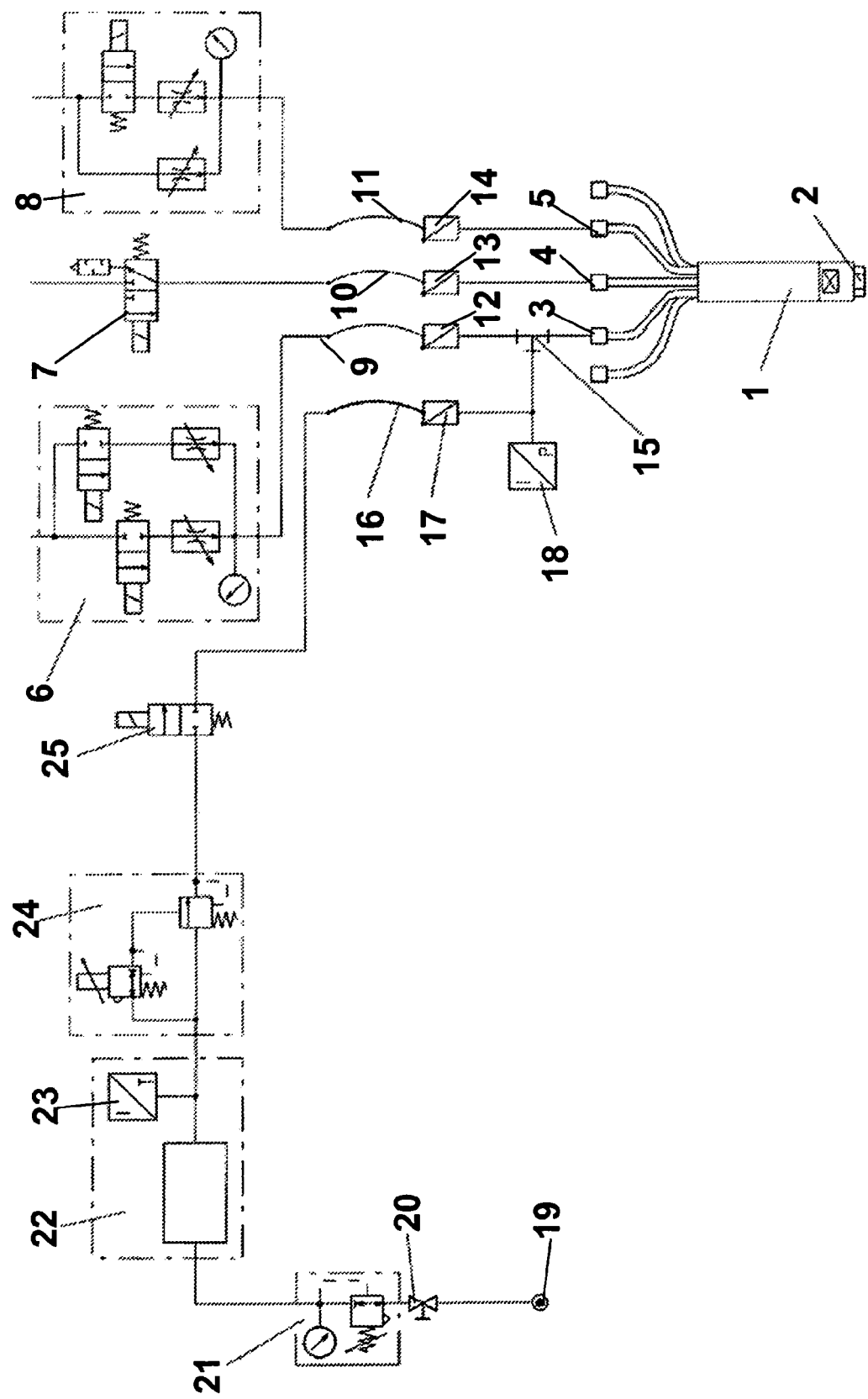

WEAR DETECTION SYSTEM FOR A CUTTING NOZZLE ON A CUTTING TORCH FOR CUTTING STEEL WORKPIECES

CROSS REFERENCE TO RELATED APPLICATIONS

This application is the U.S. national stage of International Application No. PCT/EP2011/056188, filed on Apr. 19, 2011, and claims the benefit thereof. This application is incorporated by reference herein in its entirety.

BACKGROUND

The invention concerns a method for detecting the wear of a cutting nozzle on a cutting torch for cutting steel workpieces, in particular slabs, blooms and slugs.

Cutting torches are provided for cutting steel workpieces and workpieces of iron alloys. To do so, the flame of the cutting torch, ignited by a beam of oxygen and cutting gas, is directed to the surface of the metal to be cut. The metal is thereby heated to its ignition temperature whereas a beam of cutting oxygen oxidises the heated metal so as to perform the cut. In so doing, the workpiece starts to burn and forms a seam which extends to a cut when the beam runs on. Since heat is generated further said flame cutting is designated as autogenous, i.e., the following steel layers of the spot to be cut is preheated further by the temperature which is obtained from the burning steel.

Impurities such as slag, dust and dirt particles usually accumulate on the cutting nozzle and penetrate into the nozzle whereby the lifetime of the cutting nozzle is reduced and said nozzle wears away more or less extensively. The variation in wear depends on the purpose and the operating conditions of the cutting nozzle.

SUMMARY

It is an object of the invention to provide a wear recognition system so as to check the wear rate of the cutting nozzle on the cutting torch without having to disassemble it and to install a new cutting nozzle in due time and if necessary so as to avoid problems in the subsequent production process.

The object is satisfied by the method inasmuch as a branch line exits to the cutting torch in the feed line of the heating gas connection, into which branch line a neutral medium with a set pressure is blown through the cutting nozzle after closing the medium valves for heating gas, cutting oxygen and heating oxygen, whereas said process is carried out once when installing a new cutting nozzle for the calibration thereof, and then at set intervals, depending on the usage of the cutting nozzle, said process is carried out again, in order to determine and to store in memory the wear condition of the cutting nozzle and to generate an optical and/or acoustic signal in case a predetermined maximum admissible deviation amount of the medium blown in has been exceeded.

The medium to be blown into the branch line is preferably nitrogen, so that the branch line is supplied with pressure by means of nitrogen.

DETAILED DESCRIPTION

The wear detection system according to the invention can at all times determine and store in memory the current wear status of the cutting nozzle, in comparison with the cutting nozzle in mint condition, and issue a signal in case when a maximum admissible wear deviation has been exceeded so as if necessary to replace the cutting nozzle with a new one in due time. To do so, it is not necessary to disassemble the cutting nozzle on the cutting torch since the cutting nozzle test only runs over the heating gas line.

It is another object that the pressure for the medium to be blown in during the blow-in process is maintained constant and its temperature is taken into account. In that case, the deviation amount which can be determined enables to judge the condition of the cutting nozzle.

The sequence of the cutting nozzle test for detecting the wear of a cutting nozzle on a cutting torch is as follows:
1. The new cutting nozzle is screwed into the cutting torch.
2. The mass flow rate of the medium blown in (nitrogen) is measured and stored in memory as a reference value. The cutting nozzle is hence calibrated.
3. The mass flow rate is measured repeatedly at least once a day and the measurement result is compared with the reference value stored in memory.
4. If the measured deviation exceeds the determined reference value stored in memory the cutting nozzle should be replaced.

The object is satisfied by the device inasmuch as a mass flow valve is incorporated in the feed lines for heating gas and heating oxygen and a branch line for a medium to be blown in, preferably nitrogen, is formed in the feed line for heating gas leading to the cutting torch, a branch line which includes at least one measuring section with an interpreting unit, a pre-regulator for reducing the inlet pressure of the medium to be blown in down to a set work pressure in the measuring section and a precision pressure regulator for maintaining the pressure of the medium of the medium to be blown in inside the measuring section.

The branch line preferably branches off from the feed line of the heating gas connection to the cutting torch by means of a T piece.

The measuring section consists moreover of a precision, preferably a Coriolis flow measuring device and a temperature sensor. The flowing quantity of the medium blown in can hence be measured with great precision and depending on the temperature. The precision regulator sees to it that the pressure is maintained with great precision upstream of the cutting nozzle since even small pressure deviations with respect to the measurement pressure have impacts on the measurement result.

The pre-regulator reduces the inlet pressure from the nitrogen to a set work pressure of the measuring section, for instance 6 bars.

The mass flow valve for heating gas is moreover provided at least with a disconnectable by-pass so as to disconnect completely the gas supply during the cutting nozzle test.

It goes without saying that the features aforementioned and those still to be explained below cannot solely be applied in the given combination, but also in other combinations or individually without departing from the framework of the present invention.

The idea behind the invention will be illustrated more in detail in the following description using an exemplary embodiment.

BRIEF DESCRIPTION OF THE DRAWINGS

The single drawing shows a detailed view of the exemplary embodiment described below.

DETAILED DESCRIPTION OF THE PREFERRED EMBODIMENT

A cutting torch 1 is fitted with a cutting nozzle 2 and possesses connections for heating gas 3, cutting oxygen 4 and heating oxygen 5. The infeed to the cutting torch 1 involves mass flow valves of heating gas 6, cutting oxygen 7 and possibly heating oxygen 8 over hose lines 9, 10, 11, into which respectively a non-return valve 12, 13, 14 is incorporated.

A T piece 15 is used from the feed line 12 for heating gas, which T-piece makes a branch line 16 available into which a pressure transducer 17 and a non-return valve 18 are incorporated first of all.

A connection 19 is provided for a medium to be blown in, especially nitrogen, at the other end of the branch line 16, whose way is given or blocked by a ball cock 20. A pre-regulator 21 in the branch line reduces the inlet pressure of the nitrogen to the work pressure in the measuring section 22 arranged subsequently, fitted with an interpreting unit and a temperature sensor 23.

A precision pressure regulator 24 is situated downstream of the measuring section 22 designed as a Coriolis flow measuring device, a regulator which sees to it that the pressure in the branch line 16 upstream of the cutting nozzle 2 is maintained with great precision during the cutting nozzle test by means of nitrogen. A 2/2-way magnet valve 25 is additionally situated downstream of the precision pressure regulator 24.

LIST OF REFERENCE NUMERALS

1 Cutting Torch
2 Cutting Nozzle
3 Connection for Heating Gas
4 Connection for Cutting Oxygen
5 Connection for Heating Oxygen
6 Mass Flow Valve for Heating Gas
7 Mass Flow Valve for cutting Oxygen
8 Mass Flow Valve for Heating Oxygen
9 Feed line for Heating Gas
10 Feed line for Cutting Oxygen
11 Feed line for Heating Oxygen
12 Non-return Valve for Heating Gas
13 Non-return Valve for Cutting Oxygen
14 Non-return Valve for Heating Oxygen
15 T Piece
16 Branch Line
17 Non-return Valve for Branch Line
18 Pressure Transducer
19 Media Connection
20 Ball Cock
21 Pre-regulator
22 Measuring Section
23 Temperature Sensor
24 Precision Pressure Regulator
25 2/2-way Magnet Valve

The invention claimed is:

1. A method for detecting the wear of a cutting nozzle (2) on a cutting torch (1) for cutting steel workpieces, characterised in that a branch line (16) exits to the cutting torch (1) in a feed line (9) of a heating gas connection (3), into which branch line a neutral medium with a set pressure is blown through the cutting nozzle (2) after closing medium valves (6,7,8) for heating gas, cutting oxygen and heating oxygen, whereas said process is carried out once when installing a new cutting nozzle (2) for the calibration thereof, and then at set intervals, depending on the usage of the cutting nozzle (2), said process is carried out again, in order to determine and to store in memory the wear condition of the cutting nozzle (2) and to generate an optical and/or acoustic signal in case a predetermined maximum admissible deviation amount of the medium blown in has been exceeded.

2. The method of claim 1, characterised in that the medium to be blown into the branch line (16) is nitrogen.

3. The method of claim 1, characterised in that the pressure for the medium to be blown in during a blow-in process is maintained constant.

4. A device for detecting the wear of a cutting nozzle (2) on a cutting torch (1) for cutting steel workpieces, characterised in that a mass flow valve (6,8) is incorporated in feed lines (9,11) for heating gas and heating oxygen and a branch line (16) for a medium to be blown in, preferably nitrogen, is formed in the feed line (9) for heating gas leading to the cutting torch (1), a branch line which includes at least one measuring section (22) with an interpreting unit, a pre-regulator (21) for reducing the inlet pressure of the medium to be blown in down to a set work pressure in the measuring section (22) and a precision pressure regulator (24) for maintaining the pressure of the medium to be blown in inside the measuring section (22).

5. The device according to claim 4, characterised in that the branch line (16) branches off from the feed line (9) of the heating gas connection (3) to the cutting torch (1) by means of a T piece (15).

6. The device according to claim 4, characterised in that the measuring section (22) consists of a precision, flow measuring device and a temperature sensor (23).

7. The device according to claim 4, characterised in that at least the mass flow valve (6) for heating gas is provided with a disconnectable by-pass.

* * * * *